United States Patent Office 3,152,130
Patented Oct. 6, 1964

3,152,130
PROCESS FOR PREPARING ACTIPHENOLS
Francis Johnson, Newton Lower Falls, Mass., assignor to The Dow Chemical Company, Midland, Mich., a corporation of Delaware
No Drawing. Filed Oct. 6, 1961, Ser. No. 144,011
15 Claims. (Cl. 260—281)

The present invention is directed to a process for preparing novel phenyl α-(3-glutarimidyl)acetates and to a process utilizing said novel acetates in the preparation of actiphenols.

It is an object of this invention to provide a synthetic route to the production of actiphenol and also to homologues, isomers and analogues of actiphenol. The invention also contemplates providing a process for preparing phenyl α-(3-glutarimidyl)acetates which are novel compounds useful in the preparation of actiphenols. It is also an object of this invention to provide these novel acetates and novel substituted actiphenols as well as isomers and homologues thereof.

I discovered that actiphenols can be prepared by a two-step process. In the first step a α-(3-glutarimidyl)-acetyl halide is reacted with a phenol in the presence of a base, to prepare a phenyl α-(3-glutarimidyl)acetate. In the second step the acetate product of the first step is heated in the presence of a strong Lewis acid, preferably aluminum trichloride, and then cooled and treaded with an acid solution to remove the aluminum salt and to obtain the corresponding actiphenol. The preparation is represented by the following:

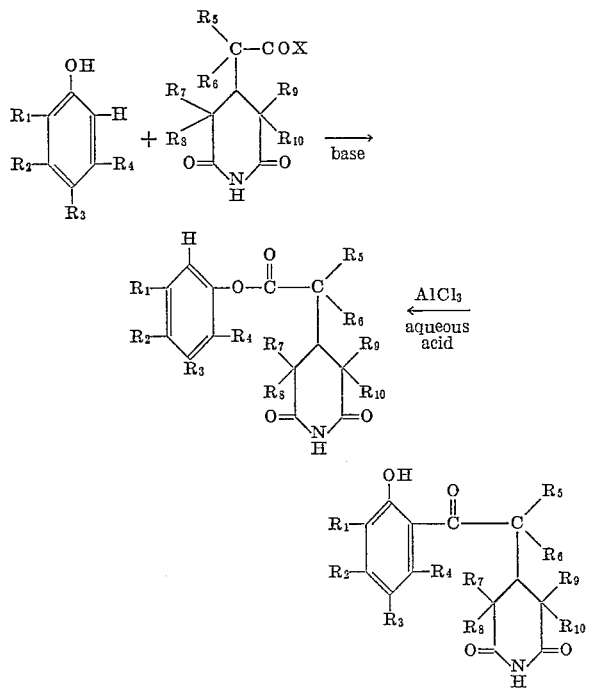

The $R_1$–$R_4$ groups represent hydrogen, lower alkyl, alkoxyl, aryloxyl, halogen (preferably chlorine or bromine), nitro, ester and ketonic groups. Adjacent groups may be fused or cyclized. The $R_5$–$R_{10}$ groups may be hydrogen or any substituting group that does not react with the reactants and products under the process conditions. They include alkyls, alkoxyls, aryls, aryloxyls, dialkylamines, etc. The preferred R groups are hydogen, the lower alkyls and the halogens. X represents a halogen, preferably chlorine or bromine.

The α-(3-glutarimidyl)acetyl chloride reactant is easily prepared by treating the corresponding 3-carboxymethyl glutarimide with thionyl chloride. The α-(3-glutarimidyl)-acetyl chloride is reacted with the phenol in the presence of a base (which acts as a scavenger for halide produced during the reaction), preferably a tertiary amine such as pyridine, to produce the corresponding phenyl α-(3-glutarimidyl)acetate. The acetate is treated with a strong Lewis acid, such as aluminum chloride, and heated until the reaction is substantially completed. At least one equivalent of the aluminum chloride per equivalent of the acetate should be used. It is preferred to use an excess of the aluminum chloride. Equivalent Lewis acids include aluminum tribromide, boron tribromide, and zinc dibromide. The rearrangement reaction in the presence of the Lewis acid is accomplished with heating at a temperature below the decomposition temperature of the desired product. The maximum temperature is dependent upon the reactants and solvent system utilized. The reaction goes more slowly at lower temperatures. For most of the compounds contemplated a temperature between 50° C. and 200° C. is suitable; a preferable temperature is between 155° C. and 160° C. At these temperatures heating may be from about ½ to 4 hours; preferably about 2 hours.

For the purpose of further explaining the invention to those skilled in the art, the following illustrative examples are given.

EXAMPLE 1

*2,4-Dimethylphenyl α-(3-Glutarimidyl)Acetate*

α-(3-glutarimidyl)acetyl chloride (prepared from 5 g. of acid) was added to pyridine (35 ml.). 2,4-dimethylphenol (5 g.) was added and the mixture warmed on a steam bath for 2 hours. At the end of this period the dark homogeneous solution was added to methylene chloride (250 ml.) and water (250 ml.). The mixture was filtered to remove a small amount of black solid and the organic layer washed with 2 N hydrochloric acid (2 x 125 ml. portions). The methylene chloride abstract was then washed with water, with sodium carbonate solution and then with water, followed by drying over anhydrous magnesium sulphate. Brief boiling of this extract with charcoal followed by filtration removed most of the color associated with the liquid. The solution was then concentrated to small bulk on a water bath and ether added to the point of spontaneous crystallization. Two crops of a highly crystalline white material were obtained of total weight, 6 g., M.P. 155–6° C. A sample of the material was recrystallized 4 times and had M.P. 160°. (Found: C, 65.3; H, 6.0; N, 5.3. Required for: $C_{15}H_{17}O_4N$: C, 65.44; H, 6.22; N, 5.09%.)

EXAMPLE 2

Following the procedure of Example 1, 3,4-dimethylphenol is used in place of the 2,4-dimethylphenol, to obtain 3,4-dimethylphenyl α-(3-glutarimidyl) acetate.

EXAMPLE 3

Following the procedure of Example 1, 2,5-dimethylphenol is used in place of the 2,4-dimethylphenol, to obtain 2,5-dimethylphenyl α-(3-glutarimidyl) acetate.

EXAMPLE 4

Following the procedure of Example 1, 2,4-diethylphenol is used in place of the 2,4-dimethylphenol, to obtain 2,4-diethylphenyl α-(3-glutarimidyl) acetate.

EXAMPLE 5

Following the procedure of Example 1, 3,4-diethylphenol is used in place of the 2,4-dimethylphenol to obtain 3,4-diethylphenyl α-(3-glutarimidyl) acetate.

EXAMPLE 6

Following the procedure of Example 1, 2,5-diethylphenol is used in place of the 2,4-dimethylphenol, to obtain 2,5-diethylphenyl α-(3-glutarimidyl) acetate.

EXAMPLE 7

Following the procedural of Example 1, 2-chlorophenol is used in place of the 2,4-dimethylphenol, to obtain 2-chloro-phenyl α-(3-glutarimidyl) acetate.

EXAMPLE 8

Actiphenol

The acetate (1.0 g.) obtained in Example 1, was mixed with aluminum trichloride (2 g.), both materials being very finely ground. The mixture was placed in an oil bath at 100° and the temperature raised to 155° C. in 15 minutes. A temperature of 150 to 160° was maintained for 2 hours during which period the mixture fused, swelled and then collapsed to a brown gum. After cooling the friable material was powdered and added to 2 N hydrochloric acid (100 ml.) and methylene chloride (100 ml.). After stirring for a short period no solid material remained and the organic layer was removed and washed with water then dried over anhydrous magnesium sulphate. Removal of the drying agent by filtration gave a bright yellow solution which on evaporation to dryness gave a semi-crystalline material. Crystallizaiton of this substance from methylene chloride and methanol proved facile and give a yellow solid (0.55 g.) of M.P. 192-195°. A sample of this substance was crystallized 4 times from the same solvent mixture to give faintly yellow plates, M.P. 198-201°. (Found: C, 65.5; H, 6.1; N, 5.0. Required for $C_{15}H_{17}O_4N$: C, 65.44; H, 6.22; N, 5.09%.) The infrared spectrum of this product was identical with that of actiphenol.

EXAMPLE 9

Following the procedure of Example 8, the acetate obtained in Example 2 was heated with aluminum trichloride to prepare the corresponding product by the rearrangement reaction.

EXAMPLE 10

Following the procedure of Example 8, the acetate obtained in Example 3 was heated with aluminum trichloride to prepare the corresponding product by the rearrangement reaction.

EXAMPLE 11

Following the procedure of Example 8, the acetate obtained in Example 4 was heated with aluminum trichloride to prepare the corresponding product by the rearrangement reaction.

EXAMPLE 12

Following the procedure of Example 8, the acetate obtained in Example 5 was heated with aluminum trichloride to prepare the corresponding product by the rearrangement reaction.

EXAMPLE 13

Following the procedure of Example 8, the acetate obtained in Example 6 was heated with aluminum trichloride to prepare the corresponding product by the rearrangement reaction.

EXAMPLE 14

Following the procedure of Example 8, the acetate obtained in Example 7 was heated with aluminum trichloride to prepare the corresponding product by the rearrangement reaction.

Similarly, other actiphenols are prepared from starting materials corresponding to the general definition wherein other substituents R groups on various ring carbons are varied. It appears that the substituents and side chains do not alter the condition of the reaction although the presence or absence of substituents on the ortho and para positions of the phenol influence the yield of the desired acetate.

The acetates produced by the first step of the process are useful intermediates in the preparation of the actiphenols. The acetates exhibit anti-fungal activity. The acetate product of Example 1 was tested for control of tomato late blight. At 75 p.p.m., 40% control was attained and at 10 p.p.m., 20% control was attained. The actiphenols have shown themselves to have unusual biocidal activity and particularly outstanding activity as anti-fungal agents. The actiphenol provided 40% control of tomato late blight at 75 p.p.m., and 30% control at 10 p.p.m.

Although the invention has been illustrated by specific examples, it is to be understood that it includes all modifications and variations that come within the scope of the appended claims.

What is claimed is:

1. A process for preparing actiphenol comprising reacting α-(3-glutarimidyl) acetyl halide with a lower alkyl substituted phenol in the presence of a tertiary amine, then heating with aluminum trichloride at a temperature between 120° C. and 200° C. for at least one-half hour, and then cooling and hydrolyzing to remove the aluminum salt.

2. The process of claim 1 wherein the halide is a chloride.

3. The process of claim 2 wherein the temperature range of the heating with aluminum trichloride is between 155° C. and 160° C.

4. The process of claim 3 wherein the phenol is 2,4-dimethylphenol.

5. The process for preparing actiphenols comprising reacting a α-(3-glutarimidyl)acetyl halide having the structural formula

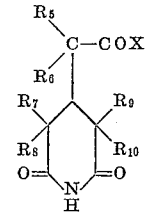

with a phenol having the structural formula

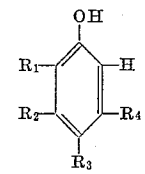

wherein $R_1$ to $R_{10}$ are each selected from the group consisting of hydrogen, lower alkyl, and halogen, and X is a halogen, in the presence of a base; then heating with a Lewis acid; and then cooling and hydrolyzing to remove the Lewis acid salt.

6. The process of claim 5 in which the heating with the Lewis acid is carried out at a temperature between 120° C. and 200° for at least one-half hour.

7. The process of claim 6 wherein said base is a tertiary amine, and said Lewis acid is aluminum trichloride.

8. The process of claim 7 wherein α(3-glutarimidyl) acetyl chloride is reacted with 2,4-dimethylphenol.

9. The process of claim 7 wherein α-(3-glutarimidyl) acetyl chloride is reacted with 3,4-dimethylphenol.

10. The process of claim 7 wherein α-(3-glutarimidyl) acetyl chloride is reacted with 2,5-dimethylphenol.

11. The process of claim 7 wherein α-(3-glutarimidyl) acetyl chloride is reacted with 2,4-diethylphenol.

12. The process of claim 7 wherein α-(3-glutarimidyl) acetyl chloride is reacted with 3,4-diethylphenol.

13. The process of claim 7 wherein α-(3-glutarimidyl) acetyl chloride is reacted with 2,5-diethylphenol.

14. The process of claim 7 wherein α-(3-glutarimidyl)acetyl chloride is reacted with 2-chlorophenol.

15. The process for preparing actiphenols comprising heating a phenyl α-(3-glutarimidyl)acetate having the formula

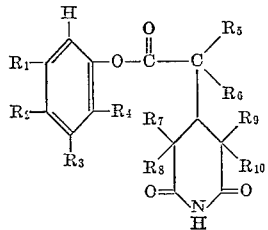

wherein $R_1$ to $R_{10}$ are each selected from the group consisting of hydrogen, lower alkyl and halogen, with a Lewis acid at an elevated temperature, and then cooling and hydrolyzing to remove the Lewis acid salt.

References Cited in the file of this patent

UNITED STATES PATENTS

| | | |
|---|---|---|
| 2,830,991 | Keller et al. | Apr. 15, 1958 |
| 2,874,158 | Langis et al. | Feb. 17, 1959 |
| 2,971,884 | Gruenhagen | Feb. 14, 1961 |
| 3,005,750 | Fluck et al. | Oct. 24, 1961 |

OTHER REFERENCES

J. Org. Chem., vol. 25, pp. 661–2 (1960).